(No Model.) 3 Sheets—Sheet 1.
W. H. WALKER & G. EASTMAN.
ROLLER HOLDER FOR PHOTOGRAPHIC FILMS.
No. 317,050. Patented May 5, 1885.
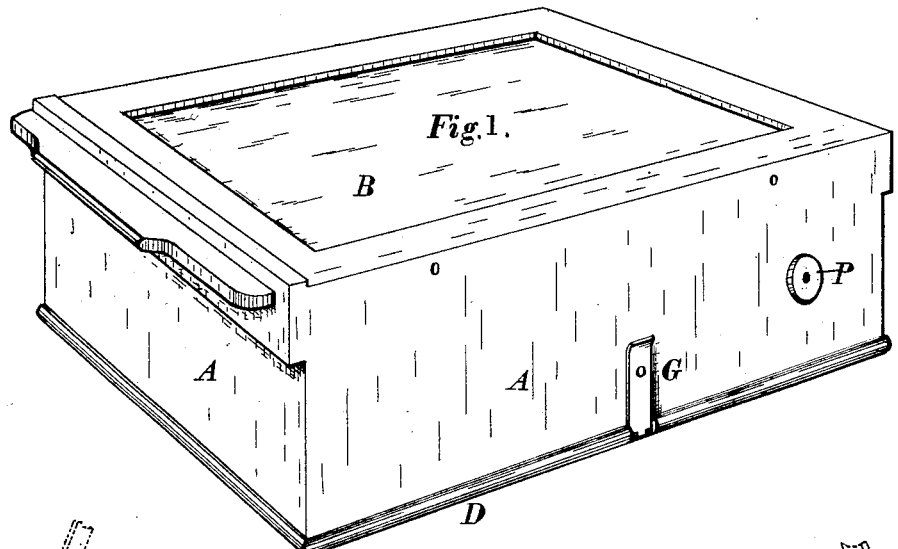
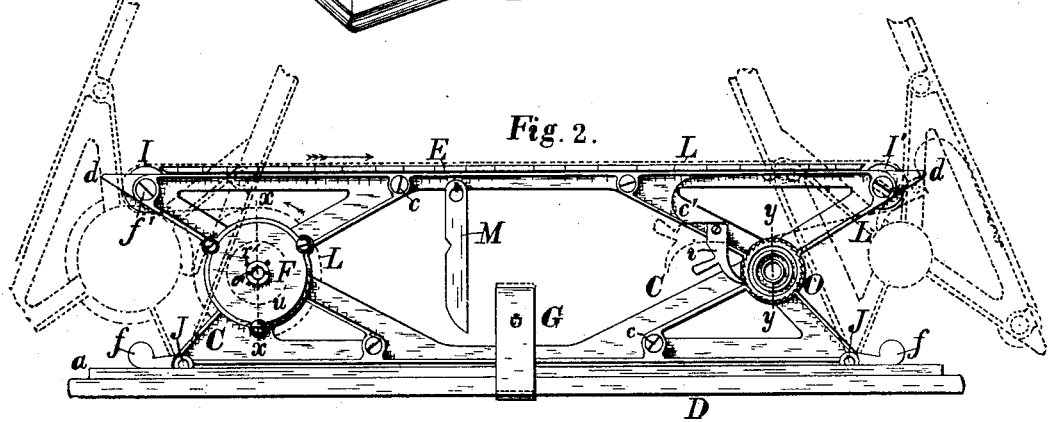
WITNESSES:
Jas. F. Gordon
H. G. Phillips
INVENTORS
Wm. H. Walker and
George Eastman,
by Geo. B. Selden,
Attorney.

(No Model.) 3 Sheets—Sheet 2.
W. H. WALKER & G. EASTMAN.
ROLLER HOLDER FOR PHOTOGRAPHIC FILMS.
No. 317,050. Patented May 5, 1885.
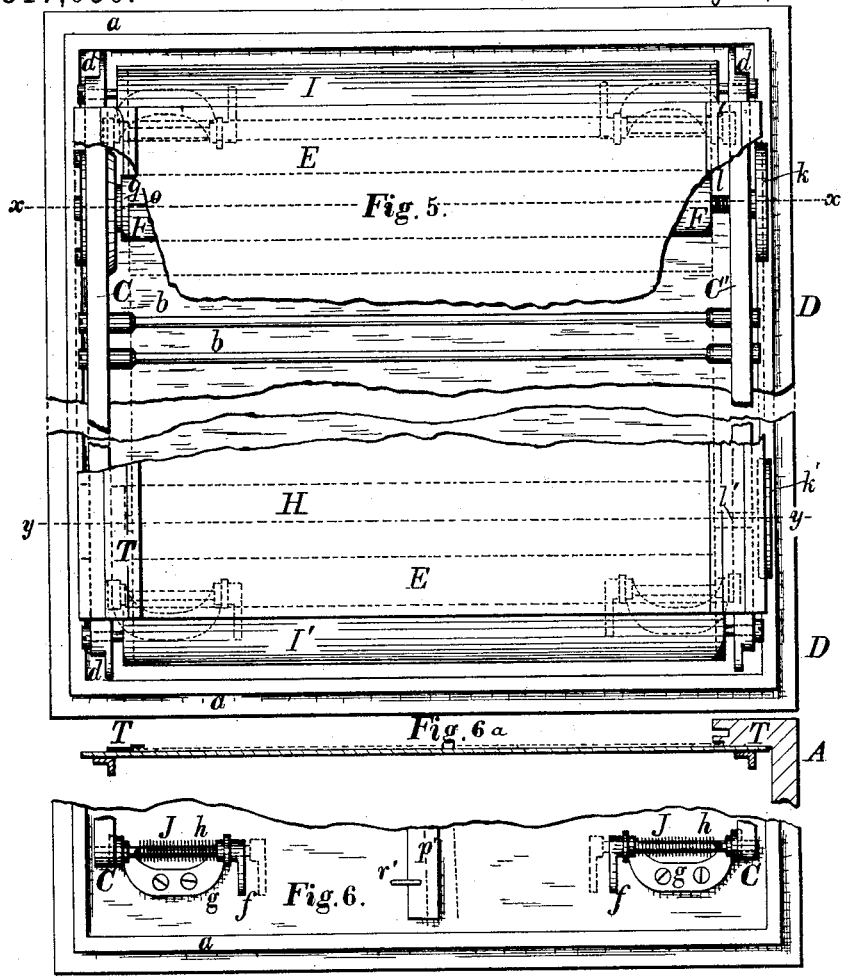
WITNESSES
Jas. F. Gordon
H. G. Phillips
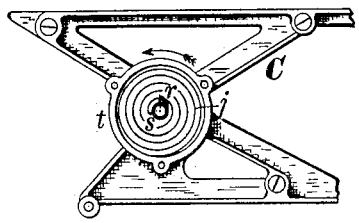
INVENTOR
Wm. H. Walker and
George Eastman,
by Geo. B. Selden,
Attorney
N. PETERS, Photo-Lithographer, Washington, D. C.

(No Model.) 3 Sheets—Sheet 3.
W. H. WALKER & G. EASTMAN.
ROLLER HOLDER FOR PHOTOGRAPHIC FILMS.
No. 317,050. Patented May 5, 1885.
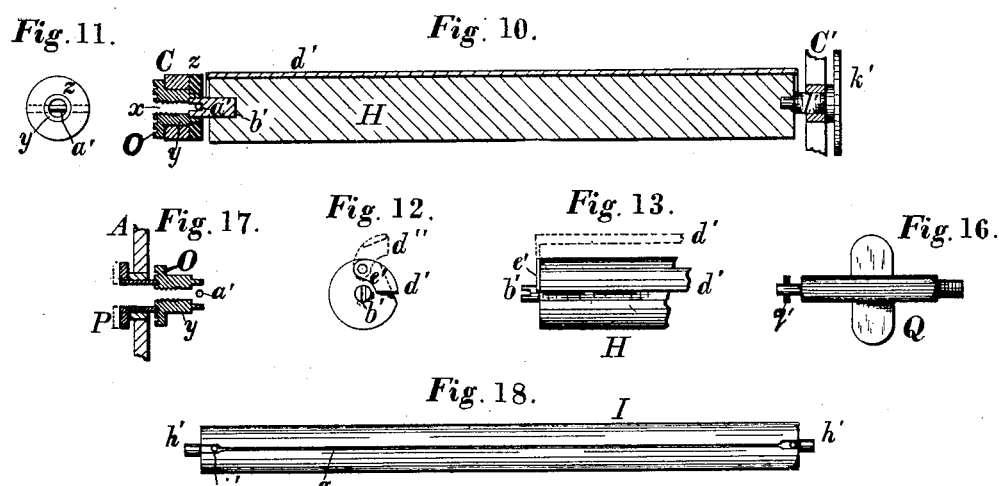
WITNESSES
Jas F Gordon
H.G. Phillips
INVENTOR
Wm H. Walker, and
George Eastman,
by Geo. B. Selden,
Attorney

UNITED STATES PATENT OFFICE.

WILLIAM H. WALKER AND GEORGE EASTMAN, OF ROCHESTER, NEW YORK, ASSIGNORS TO THE EASTMAN DRY-PLATE AND FILM COMPANY, OF SAME PLACE.

ROLLER-HOLDER FOR PHOTOGRAPHIC FILMS.

SPECIFICATION forming part of Letters Patent No. 317,050, dated May 5, 1885.

Application filed December 12, 1884. (No model.)

*To all whom it may concern:*

Be it known that we, WILLIAM H. WALKER and GEORGE EASTMAN, citizens of the United States, residing at Rochester, New York, have invented certain Improvements in Roller-Holders for Photographic Films, of which the following is a specification, reference being had to the accompanying drawings.

Our invention relates to certain improvements in roller-holders for exposing in the camera flexible sensitized photographic films, which improvements are fully described in the following specification, and the novel features thereof specified in the annexed claims.

In the accompanying drawings, representing our present improvements in roller-holders, Figure 1 is a perspective view. Fig. 2 is a side elevation, showing frame-work of the holder detached from the case. Fig. 3 is a central longitudinal section, showing the case in dotted lines. Fig. 4 represents the alarm device. Fig. 5 is a plan view of the holder, the casing being removed. Fig. 6 represents a portion of the interior of the back of the case, showing the catches by which the roller-frame is attached thereto. Fig. 6ᵃ is a transverse section through the film-supporting plate, showing the guards at the margins of the film. Fig. 7 is a section through the spool on the line $x\ x$, Figs. 2 and 5. Fig. 8 represents the collar at the end of the spool, as seen from the inside of the frame, and also a side view of the same. Fig. 9 represents the tension-spring. Fig. 10 is a longitudinal section through the reel on the line $y\ y$, Figs. 2 and 5. Fig. 11 represents the collar at the end of the reel. Figs. 12 and 13 are respectively end and side views of the reel, showing the device for attaching the film thereto. Fig. 14 is an end view of the spool. Fig. 15 is a side view of the stud of the tension device. Fig. 16 represents the screw-key. Fig. 17 is a section showing the socket in the casing through which the screw-key is introduced to turn the reel. Fig. 18 represents one of the guide-rolls. Fig. 19 is a central longitudinal section of the same.

Our improved roller-holder or apparatus for exposing flexible sensitive films in photographic cameras consists, essentially, of an outer casing, A A, adapted to be attached light-tight to a camera of any ordinary construction, and provided with the usual exposing-shutter, B, and inclosing a suitable framework, C C′, secured to the back D of the case, which frame-work supports a pair of rollers, on which the film is wound, a plate, E, which sustains the film in place during the exposure, and the other parts of the apparatus.

Our invention also comprises alarm and perforating devices and mechanism for maintaining a sufficient tension on the film. F represents the roller on which the flexible film is wound before exposure, and which, to distinguish it, we call the "spool."

Our invention also comprises the new article of manufacture formed by the spools wound with our improved photographic films, (such as described in our previous patents,) and provided at their ends with devices by which they may be inserted in a roller-holder, the whole being inclosed in a suitable light-tight case or wrapper, ready for delivery to the trade.

In the accompanying drawings, representing our improved roller-holder, A A is the outer casing, which is made of any suitable size and shape, arranged to be attached light-tight to any ordinary camera, and provided with the usual exposing-shutter, B.

D is the back of the holder, which is provided with clasps G, or other suitable devices by which it is removably secured to the case. The inside of the back may be provided with a rabbet, $a$, by which it is fitted light-tight to the case.

C C′ are two side frames, which are connected together at a suitable distance apart by the cross bars or rods $b\ b$, Fig. 5, secured by screws $c\ c$, Fig. 2, and which frames support the plate E and the spool F, and the roller H, on which the film is wound after exposure, and which roller we call the "reel." The frame-work and its attached parts are fastened to the back D of the holder by means of the catches J J, so that it may be entirely disconnected from the back, or either end may be disconnected at will, so that the frame-work can be turned up at an angle with the back, as indicated by the dotted lines in Fig. 2, to afford access to the spool or the reel. The ends d d of the frames C C' are made to project, so as to protect the film around the guide-rolls I I' from injury when the frame is turned upward, as indicated in Fig. 2. The operations of removing exposed films or of inserting fresh spools wound with film are materially facilitated by this arrangement.

The frames C C' are made preferably of metal, as light as is consistent with sufficient strength, and of any suitable form adapted to sustain the spool F, reel H, plate E, and guide-rolls I I' in their proper relative positions. At their outside ends the frames are provided with openings into which the ends of the sliding catches J J engage when the frame-work is connected to the back D. The catches J J are arranged to slide in holes in the ears of the ear-plates g, Fig. 6, being provided with the springs h, by which their outer ends are held engaged with the frames C C', and with projecting arms f, by which they are withdrawn, when required, to detach the frame-work from the back. It is obvious, however, that any other suitable form of catch or attaching device may be employed in place of that herein described for detachably connecting the frame-work to the back of the roller-holder. We have, however, found the device herein shown for the purpose in hand satisfactory in practical use.

As already mentioned, the sensitive film L is introduced into the holder, wound in sufficient quantity for a number of exposures on the spool F. The film is carried over the guide-roller I, along the plate or support E, over the guide-roller I', and has its end attached to the reel H. An exposure having been made, it is required to move the film along the plate E a sufficient distance to bring an unexposed length of film in front of the plate, and this is accomplished by turning the reel H by means of a detachable key or wrench, Q, Fig. 16, which passes through the casing of the holder at P, Fig. 1, in the proper direction, as indicated by the arrows, to unwind the film from the spool and wind up the exposed portion on the reel.

In order to maintain a sufficient amount of tension on the film, and to secure its lying flat on the plate E, we provide the reel H with the ratchet O and spring-pawl i, Figs. 2 and 17, by which any reverse motion of the reel is prevented, and we connect with the spool a tension device or spring-brake, j, Figs. 7 and 9. The tension device also serves to permit any contraction or expansion of the film due to loss or absorption of moisture.

The spool F is supported at one end on the point of the screw l, Fig. 5, so that it may revolve freely. The screw l passes through a threaded hole in the frame C', and is provided outside the frame with the milled head k, by turning which its point may be withdrawn from an opening in the end of the spool, so that the latter may be removed from the frame. At the other end the spool is provided with a transverse slot, m, into which fits the projecting rib o, Figs. 7, 8, and 14, on the revolving collar q when the reel is placed in the holder. By this means the collar is caused to turn with the spool. The collar is attached to the stud s, to which the inner end of the coiled spring j, Fig. 9, is secured, which revolves with the stud and spool, but offers a certain amount of resistance to the rotation due to the friction between the outer end of the spring and the inner surface of the circular recess t, formed for the reception of the spring in the side frame, C. The spring is held in place in the recess by a cap or cover, u, Fig. 2, attached to the frame by screws or other suitable devices. The stud s is provided with a projecting pin, r, Fig. 9, which engages in an opening in the inner end of the spring j. The inner end of the stud s is slotted to receive the rib o on the collar, (see Fig. 15,) the end of the stud projecting through the central opening, p, Fig. 8, in the collar, and engaging in the hole n, Fig. 14, in the end of the spool, serving to center the latter on the collar. A pin, v, Fig. 7, passing through the stud s and rib o, serves to secure the parts in place.

As the spring j revolves in the direction of the arrow in Fig. 9, and as the outer end or coil of the spring bears against the circular wall of the recess t in the frame, when the reel is turned the spring will be compressed until the strain or pull of the film on the spool will overcome the friction between the outer end of the spring and the recess, after which the spring will revolve with the spool whenever the latter turns, but will constantly maintain an elastic tension on the film, which will serve to keep the film strained flat along the plate E, but will permit of any expansion or contraction in the film caused by losing or absorbing moisture from the atmosphere.

The stud s may be provided with a threaded hole, w, Fig. 7, at its outer end, into which one end of the screw-key Q, Fig. 16, may be inserted, if it is desired for any purpose to wind back any film onto the spool.

Like the spool, the reel H is provided at one end with a device by which it may be removed from the holder, which may consist of the screw l', Fig. 5, passing through the frame C', and having the milled head k' on its outer end. At its other end the reel is detachably connected with the toothed ratchet O, so as to revolve therewith, in any suitable way. In the drawings we have represented the ratchet as supported on the outside of the frame by the journal y, Figs. 10 and 17, which passes through the frame, and has the collar z secured on its inner end by the pin a'. The reel is provided with the projecting stud b', the end of which is slotted, and fits an opening in the inner end of the journal y, the slot engaging with the pin a', so as to cause the reel and ratchet to revolve together. The ratchet is provided with a threaded hole, x, Fig. 10, into which one end of the screw-key Q is fitted when it is desired to turn the reel to wind the film onto it, the direction of the screw being preferably such that the reel cannot be turned in the wrong direction without unscrewing the key from the hole.

The construction of the pawl $i$ and its spring $c'$ is such that the pawl may be disengaged from the ratchet O, as indicated by the dotted lines in Fig. 2, whenever it is desired to turn the reel backward to unwind the film or any portion thereof from the reel.

The screw-key Q passes through the casing A in an opening in the socket P, Fig. 17, the inner end of which is made to fit a groove in the side of the ratchet O to exclude the light. The socket P is arranged to slide in and out through the case, so that its inner end may be disengaged from the groove in the ratchet when the back and frame-work of the holder are removed from the case.

In order to attach the end of the film to the reel, we provide the reel with the swinging clip or bar $d'$, Figs. 3 and 12, which extends longitudinally along the reel and holds the film between its inner surface and the reel. The reel is preferably slightly flattened lengthwise opposite the clip, which is provided with arms $e'$ at each end, pivoted on pins inserted in the ends of the reel. The operation will be understood from the sectional view, Fig. 3, in which the end of the film L is shown as passed under the clip or bar in such direction that turning the reel in the direction of the arrow will draw the clip down against the surface of the reel, thereby clamping the film between the clip and the reel. In Figs. 12 and 13 the clip is shown as opened or swung outward from the reel at $d''$ in dotted lines.

The guide-roll I revolves on the points of the screws $f'$, inserted in the frames C C'. It is provided with film-perforating and alarm devices, and a longitudinal slot, $g'$, Fig. 18, serves to direct the knife in dividing the film. A suitable knife may be provided with the apparatus, as shown at M, Fig. 2. The guide-roll is preferably made of wood to secure lightness, in which case it may be provided at each end with the metallic centers $h'$, Fig. 18, to receive the points of the screws $f'$. The diameter of the roll is such that it will make a given number of revolutions for each length of film requisite for any given exposure which passes around it. Thus for an eight-and-one-half-inch exposure the roller, if made sixty-seven one-hundredths of an inch in diameter, will turn four times. Any other proportion may, however, be chosen, and the guide-roll may be made of such dimensions as to revolve but once for any given length of film.

In order to mark the film so as to indicate where it should be divided between different exposures, we provide the guide-roll I with a projecting point, $i'$, Figs. 4 and 18, near one or both ends, which point will make a fine perforation near the edge of the film as it passes around the roll. In the case supposed, where the roll revolves four times for each length of film requisite to make a negative of the desired size, the film will be perforated four times for each exposure, and consequently requires to be divided at each fourth perforation in order to detach the separately-exposed portions from each other. The perforating-points $i'$ are attached to stem or rods $t'$, Fig. 19, arranged to slide lengthwise in holes made in the roll, so that they may be moved outward beyond the edge of the film as it passes about the roll, in case it be desired for any purpose to throw them out of action. The end of the rod $t'$ may be made to slide outward beyond the end of the roll, as indicated at $t''$, Fig. 19, to engage with a hole in the frame, to prevent the roll from turning during the operation of cutting off the film.

The alarm device is represented in Fig. 4. The end of the roll I is provided with a projecting stud, $m'$, which at every revolution comes in contact with a spring, $n'$, attached to the plate E or the frame-work or casing of the holder, which spring, being bent and released by the movement of the pin, recoils and strikes against the plate or casing, so as to make a noise, which attracts the attention of the operator and warns him when to stop turning the reel. In the case supposed the spring would strike four blows while the requisite length of film for a single exposure would pass along the plate E.

The guide-roller I' is simply a plain roller, about which the film passes on its way to the reel H.

The plate E may be made of metal, hard rubber, wood, or other suitable material, being attached to the side frames, C C', by means of screws or rivets. If formed of wood, it preferably consists of a series of narrow strips glued together. In order to prevent any tendency in the film to curl up at the edges, thereby throwing it out of focus along its margins, we attach to the plate or casing the guards T, Fig. 6ª, which extend for a short distance over the edge of the film along its margin, and prevent it from curling outward away from the plate. These guards preferably extend the whole length of the plate on each side of the film. They may be applied in several different ways. Thus, as shown in Fig. 6ª, on the left, they consist of a strip of metal bent in suitable shape and attached to the plate by screw or rivets, so that the inner edge projects slightly over the margin of the film. The end of the guard where the film enters between it and the plate may be bent or beveled outward, to prevent the margin of the film from injury as it passes this point.

The guard may be fastened to the plate by screws or clips, so that it can be removed therefrom at the time the film is placed along the plate; or the guards may be arranged to yield laterally a short distance to and from the film, being provided with a suitable spring or springs for this purpose; or the guard may be attached to the inner side of the case, as represented at the right hand in Fig. 6ª, the guard in this case consisting of a strip of metal or wood attached to the interior of the casing A, in such position that when the apparatus is put together for use the edge of the guard will hold the margin of the film down on the plate in its proper position.

The operation of our improved roller-holder for photographic films will have been already understood by the practical photographer from the foregoing description. The spool of film having been inserted in the holder, the operator passes the film over the guide-rollers I and I' and attaches its end to the reel H by means of the clip d'. The sensitized side of the film is outward, the back of the film resting against the plate E. The holder, having been attached to the case, is now ready to be used in making exposures in the camera. After each exposure the operator turns the key Q until the spring n' warns him, by the noise of its recoil, that he has drawn a sufficient length of film from the spool for the next exposure. On returning to his darkroom the exposed parts of the film are separated from the unused portions, the end of the latter being again attached to the reel, if the whole film has not been exposed, and the film is ready for other exposures, and so on until the spool of film is entirely exhausted. The tension device on the spool serves to keep the film drawn tight and flat along the supporting-plate E, and to insure its being wound tightly on the reel, and in rewinding from the reel onto the spool a sufficient tension may be secured by pressing the hand against the back of the film on the reel; or a friction device may be applied, if desired—as, for instance, the spring or springs p', Figs. 3 and 6, which are attached to the back D, and held down when not in use by the catch r', Fig. 6, but which may be detached therefrom and allowed to spring up and press against the film on the spool or the reel, as indicated by the dotted lines in Fig. 2.

The operation of rewinding, if necessary, will of course be performed in the dark-room.

It is obvious that many changes may be made in our invention without departing from the principles thereof. Thus the film-straining device may be connected with the reel, a friction-brake being applied to the spool, and various other changes may be made in the relative arrangement of the film-operating rollers and the film-straining device.

In order to provide for putting the film on the holder without wasting any of it by winding it onto the reel, we may employ means for causing a tension on the spring j at the time the spool is inserted. Thus by slotting the outer end of the stud s, as shown at o', Fig. 2, and inserting a stud, q', in one end of the key Q, the key can be used to turn the stud, thereby coiling up the spring until a sufficient tension is produced, when the key is pushed farther inward until the stud q' enters the slots r', cut in the plate u, whereby the spring is held in tension until the spool has been inserted in the holder—enough of the film having been unwound to permit the attachment of its end to the reel H—after which the removal of the key allows the spring j to uncoil partially and produce the requisite strain on the film; or the same result may be accomplished by attaching to the stud a ratchet provided with a spring-pawl pivoted to the frame, which is engaged with the ratchet until the spool is inserted and the film attached to the reel, after which it is disengaged therefrom, so as to allow freedom to the spring to strain the film.

Another means of accomplishing the same result is shown in Fig. 8, in which a notch, z', is cut in the edge of the collar q, into which the end of spring w', attached to the frame, is bent when it is desired to prevent the spring j from unwinding. The edge of the notch is undercut, and the end of the spring w' is beveled, so that it cannot release itself from the notch until the collar is partially rotated.

We have combined the film-tension device with the reel, using a friction-brake on the spool; but we prefer the construction herein shown.

The present invention being in several particulars an improvement upon that disclosed in our application, No. 140,000, filed August 8, 1884, all matters claimed in said last-mentioned application are herein disclaimed.

We claim—

1. In a roller-holder for exposing photographic films, the combination of the spool F, reel H, film-support E, and guards T, substantially as described.

2. In a roller-holder for exposing photographic films, the combination of the spool F, reel H, film-support E, and guards T, attached to the casing of the holder, substantially as described.

3. In a roller-holder for exposing photographic films, the combination of the spool F, reel H, guide-rolls I I', film-support E, and guards T, substantially as described.

4. The spool wound with sensitized photographic film and provided with a socket at one end and a socket and cross-groove at the other, whereby it is adapted to be inserted between the adjusting-screw and the stud, and connected so as to be rotated by the latter, substantially as described.

5. The combination, with the casing of a roller-holder for exposing photographic films, provided with a removable back, of a suitable frame supporting the film-carrying rollers detachably affixed thereto, substantially as described.

6. The combination, with the casing of a roller-holder for exposing photographic films, of a removable back having a frame adapted to support the film-carrying rollers hinged thereto, substantially as described.

7. The combination, with the removable back D of a roller-holder, of the frames C C', plate E, spool F, reel H, and catches J J, substantially as described.

8. The combination, with the frames C C', plate E, spool F, and reel H, of the projecting ends d d at one or both ends of the frame, substantially as described.

9. The combination, with the casing and film-carrying roll of a roller-holder, of the light-tight key-connection P, substantially as described.

10. The combination, with the casing A, of the reel H, grooved ratchet O, and key-connection P, substantially as described.

11. In a roller-holder, and in combination with the inclosing-case and the film-carrying spool and winding-reel located therein, the guide-roll I, provided with a longitudinal groove, g', substantially as and for the purposes set forth.

12. The combination, in a roller-holder, of the guide-roll I, provided with longitudinal groove g', and film-marking point i', substantially as described.

13. The combination, in a roller-holder, of the guide-roll I, provided with longitudinal groove g', and a locking device, substantially as described.

14. The combination, with the reel H, provided at one end with a grooved collar, O, having a central threaded opening, of the light-tight perforated key-connection P, arranged to slide through the casing of the holder, substantially as described.

15. The combination, in a roller-holder, of the reel and spool provided with a spring tension device and means for preventing the uncoiling of the spring during the operation of inserting the film in the holder, substantially as described.

16. In a holder for photographic films, and in combination with the inclosing-case provided with a shutter, as described, a removable film carrying and feeding mechanism hinged or pivoted to its supporting-frame, whereby the film-actuating mechanism can be removed from the case and turned up, as and for the purpose set forth.

17. In a holder for photographic films, and in combination with the inclosing-case provided with a shutter, as described, a film carrying and feeding mechanism detachably secured to the back, and the latter removably applied to the inclosing-case, substantially as described.

18. In a holder for photographic films, the frame supporting the film carrying and feeding mechanism, secured to the base or back board by transverse movable bolts at each end, whereby the said mechanism may be detached at either end and swung or turned back upon the bolts at the opposite end, substantially as described.

19. In a roller-holder such as described, and in combination with the stud or spindle adapted to engage the film-supply spool and a tension-regulating device applied to said spindle, a key adapted to engage the end of the stud or spindle to wind up the tension device, and a series of detents to engage the said key, and thereby lock the stud or spindle in position, as and for the purpose set forth.

20. In a roller-holder for photographic films, and in combination with the reeling devices arranged within the inclosing-case, and adapted to be operated from the exterior of said case, the light-excluding socket or tube projecting through the case and engaging the end of the reel-operating mechanism to which the key is applied, substantially as described.

21. In a roller-holder, and in combination with the inclosing-case and a removable film carrying and reeling mechanism applied thereto, a light-excluding socket engaging a portion of the reeling mechanism, and provided with an opening for the passage of the operating-key, substantially as described.

WM. H. WALKER.
GEO. EASTMAN.

Witnesses:
GEO. B. SELDEN,
L. A. KANE.